United States Patent
Sumner et al.

(10) Patent No.: US 7,953,996 B2
(45) Date of Patent: May 31, 2011

(54) ACPI TO FIRMWARE INTERFACE

(75) Inventors: William Sumner, Ft. Collins, CO (US); Bradley Culter, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1198 days.

(21) Appl. No.: 11/640,572

(22) Filed: Dec. 18, 2006

(65) Prior Publication Data

US 2008/0148033 A1 Jun. 19, 2008

(51) Int. Cl.
G06F 1/26 (2006.01)
G06F 1/32 (2006.01)

(52) U.S. Cl. .................. 713/320; 713/300; 719/310

(58) Field of Classification Search .................. 713/300, 713/320; 719/310
See application file for complete search history.

(56) References Cited

U.S. PATENT DOCUMENTS

| | | | | |
|---|---|---|---|---|
| 6,167,511 | A * | 12/2000 | Lewis | 713/2 |
| 6,185,677 | B1 * | 2/2001 | Nijhawan | 713/2 |
| 7,124,237 | B2 * | 10/2006 | Overton et al. | 711/6 |
| 7,178,014 | B2 * | 2/2007 | Nalawadi et al. | 713/1 |
| 7,502,803 | B2 * | 3/2009 | Culter et al. | 1/1 |
| 7,558,724 | B2 * | 7/2009 | Rostampour et al. | 703/27 |
| 2004/0123290 | A1 * | 6/2004 | Overton et al. | 718/1 |
| 2004/0243534 | A1 * | 12/2004 | Culter et al. | 707/1 |
| 2005/0091649 | A1 * | 4/2005 | Qureshi | 717/140 |
| 2006/0174231 | A1 * | 8/2006 | Wei et al. | 717/137 |
| 2006/0248282 | A1 * | 11/2006 | Rostampour et al. | 711/141 |

* cited by examiner

Primary Examiner — Thomas Lee
Assistant Examiner — Jaweed A Abbaszadeh (57) ABSTRACT

In one embodiment a computer system comprises a processor, a basic input/output system (BIOS) including logic instructions which, when executed by the processor, configure the processor to create a virtual AML device data structure, the data structure comprising a plurality of fields to hold arguments to a native firmware function, store at least one argument for the native firmware function in a register of the AML device data structure, store an entry point and a pointer value in a register of the virtual AML device data structure, and initiate an access request to a firmware access register in the AML device data structure.

20 Claims, 4 Drawing Sheets

ACPI TO FIRMWARE INTERFACE

TECHNICAL FIELD

This application relates to electronic computing, and more particularly to providing an interface between an ACPI AML interpreter and native firmware.

BACKGROUND

ACPI is a specification that makes hardware status information available to an operating system in computers, including laptops, desktop, servers, etc. More information about ACPI may be found in the Advanced Configuration and Power Interface Specification, Revision 3.0b, Oct. 10, 2006, cooperatively defined by Hewlett-Packard Corporation, Intel Corporation, Microsoft Corporation, Phoenix Technologies Ltd., and Toshiba Corporation. The ACPI specification was developed, in part, to establish industry common interfaces enabling robust operating system (OS)-directed motherboard device configuration and power management of both devices and entire systems. ACPI is the key element in operating system-directed configuration and power management (OSPM).

ACPI is used in personal computers (PCs) running a variety of operating systems, such as Windows® available from Microsoft Corporation, Linux, available as open source form a variety of vendors, and HP-UX, available from Hewlett-Packard Company. ACPI also allows hardware resources to be manipulated. For example, ACPI assists in power management by allowing a computer system's peripherals to be powered on and off for improved power management. ACPI also allows the computer system to be turned on and off by external devices. For example, the touch of a mouse or the press of a key may wake up the computer system using ACPI.

Traditionally ACPI has been difficult to work with for a variety of reasons. First, ACPI is not written in the native assembly language of any computer system platform. Instead, ACPI has its own source and machine languages, i.e., ACPI Source Language (ASL) and ACPI Machine Language (AML), respectively. Because of its highly specialized use, there are relatively few ASL programmers; ASL has relatively few constructs because of its limited use. Furthermore, ACPI code is conventionally monolithic in its design. Consequently, this makes it difficult to port the ACPI code to other platforms or even to different configurations of the same platform. Thus, new ASL code needs to be written to work with newly-engineered platforms. The limited number of ASL programmers makes writing new code all the more problematic and costly.

ACPI comprises both static and interpretable tables. At boot-up time, the system firmware (typically the BIOS, or Basic Input/Output System) constructs the static tables, which are consumed by the operating system. The interpretable tables are composed of AML, which is compiled and then merged into the system firmware. The operating system reads the AML from the interpretable tables and executes the architected interfaces, using an ACPI interpreter. In this fashion, the operating system manipulates hardware resources. Because the interpretable tables are merged into the system firmware, this conventional method lacks flexibility, and scalability, and requires considerable time to re-program to accommodate divergent system configurations.

Further, native firmware is typically written in a low-level language such as, e.g., assembler language or sometimes in a "C" programming language, while AML runs in a virtual machine referred to as the AML interpreter. Many functional capabilities of native firmware that operate before the AML interpreter is available are also useful during operation of AML control methods. Presently, there is no mechanism to allow an AML control method to access native firmware capabilities. Hence, many functional capabilities are implemented in both native firmware and in AML. This redundancy is expensive and wasteful of resources.

DETAILED DESCRIPTION

Described herein are exemplary system and methods to provide an interface between an ACPI AML interpreter and native firmware in a computing system. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
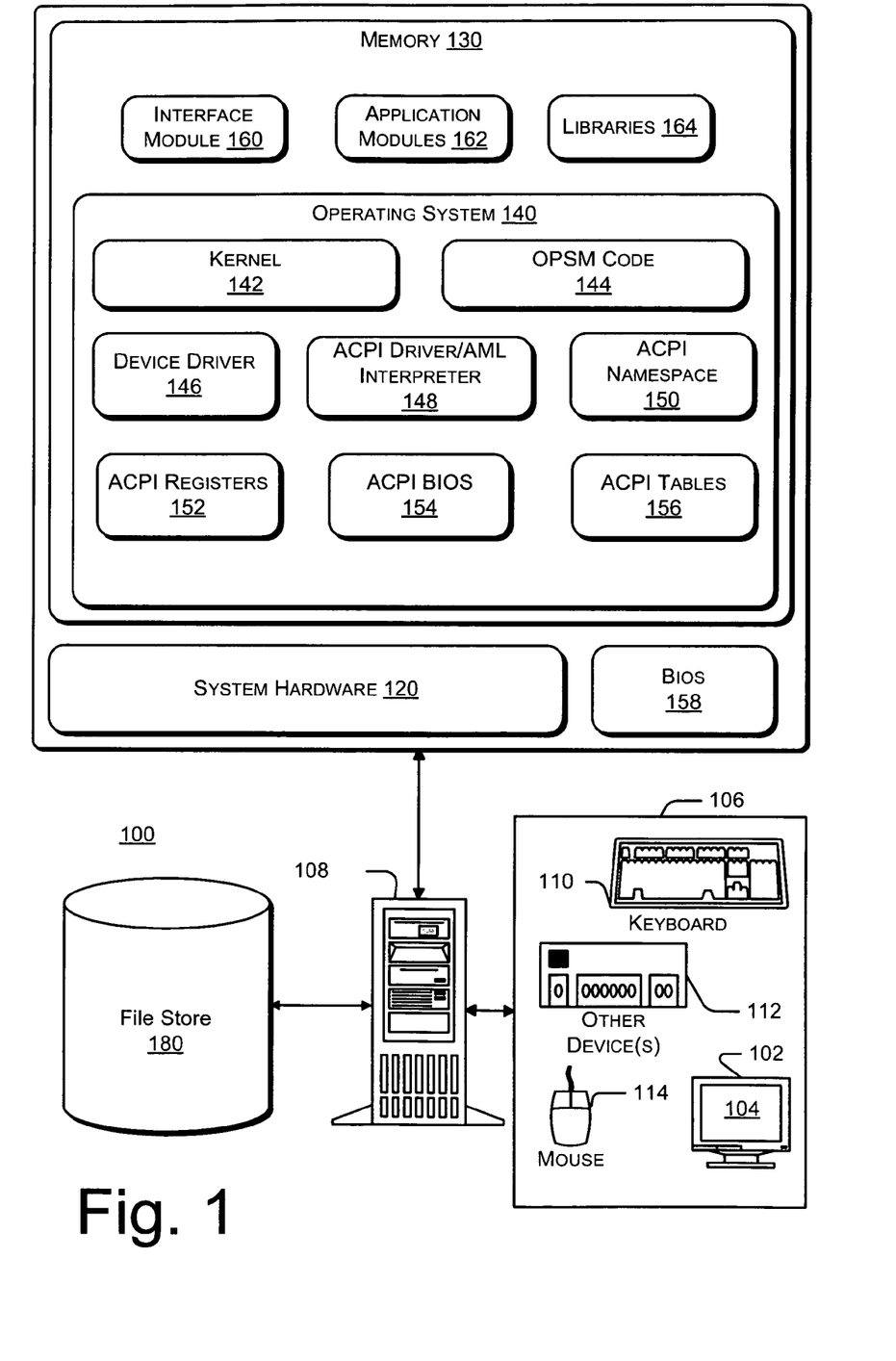
FIG. 1 is a schematic illustration of one embodiment of a computing system that includes an ACPI to firmware interface.

FIG. 1 is a schematic illustration of an exemplary computer system 100 adapted to include manage ACPI tables 156. The computer management system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 and random access memory and/or read-only memory 130. A file store 180 is communicatively connected to computer 108. File store 180 may be internal such as, e.g., one or more hard drives, or external such as, e.g., one or more external hard drives, network attached storage, or a separate storage network.

The particular embodiment of operating system 140 is not critical to the subject matter described herein. Operating system 140 may be embodied as a UNIX operating system or any derivative thereof (e.g., Linux, Solaris, etc.) or as a Windows® brand operating system.

Computing system 100 further includes a number of components to facilitate ACPI table management. Although the subject matter is with reference to ACPI table management, there is no intention to limit the claims to ACPI configuration systems. Rather, the subject matter describe herein may operate with and provide benefits with any operating system, architecture, and/or configuration management system.

Memory 130 includes an operating system 140 for managing operations of computer 108. In operation, one or more application modules 162 and/or libraries 164 executing on computer 108 make calls to the operating system 140 to execute one or more commands on the computer's processor.

The operating system 140, in turn, invokes the services of system hardware 120 to execute the command(s). The operating system kernel 142 can be generally considered as one or more software modules that are responsible for performing many operating system functions.

In one embodiment, the kernel 142 interfaces with Operating System Power Management (OSPM) system code 144. The OSPM system code 144 comprises one or more software modules that may be a part of the operating system 105 and that may be used to modify the behavior of certain components of the computer system 100, typically to manage power consumption in accordance with pre-configured power conservation settings. The various device drivers 146 interface with and generally control the hardware installed in the computer system 100.

ACPI Driver/AML Interpreter 148 is a software module loaded during system start-up, which functions as an interface between the operating system 140 and an ACPI BIOS 154. ACPI Driver/AML Interpreter 148 populates an ACPI namespace 150 at system startup, loads description blocks from the system BIOS ACPI namespace at run time, handles certain general purpose events triggered by ACPI hardware, and passes other general purpose events to modules registered to handle those events, and the like.

A driver communicates with other drivers and the operating system components (e.g., an I/O manager or the kernel 142), for example in the Windows® 2000 operating system, by passing messages called I/O request packets (IRPs) up and down a "driver stack." As will be understood by those skilled in the art, drivers for a particular hardware device may be "stacked" such that messages directed either down to the hardware device or back up to the operating system (or other program module) are passed through a chain of drivers in a driver stack before reaching their destination. An ACPI driver 148 may be inserted into a driver stack to add functionality to the hardware device.

In one embodiment, the ACPI driver 148 creates a filter Device Object (filter DO) or a Physical Device Object (PDO) in the driver stack for each device described in an ACPI namespace 150. If the device is capable of being enumerated by an element of another subsystem, such as a Plug-n-Play subsystem, that element of the other subsystem may create the PDO for the device and the ACPI driver 148 may put a filter DO on top of the PDO. The operating system 140 provides power management features to the device stack by means of these device objects.

The ACPI BIOS 154 refers to the portion of system firmware that is compatible with the ACPI specification. The ACPI BIOS 154 manages the boot-up process for the computing system 100 the machine and implements interfaces for power and configuration operations, such as, e.g., sleep, wake, and some restart operations. ACPI BIOS 154 contains definition blocks used to construct ACPI Tables 156 such as, e.g., the DSDT and the SSDT. Although the BIOS 158 and the ACPI BIOS 154 are illustrated as separate components in FIG. 1, they may be implemented as one component in the computer system 100.

The ACPI Tables 156 include a Root System Description Table (RSDT), a Differentiated System Description Table (DSDT) and one or more Secondary System Description Tables (SSDTs).

Figure 2:
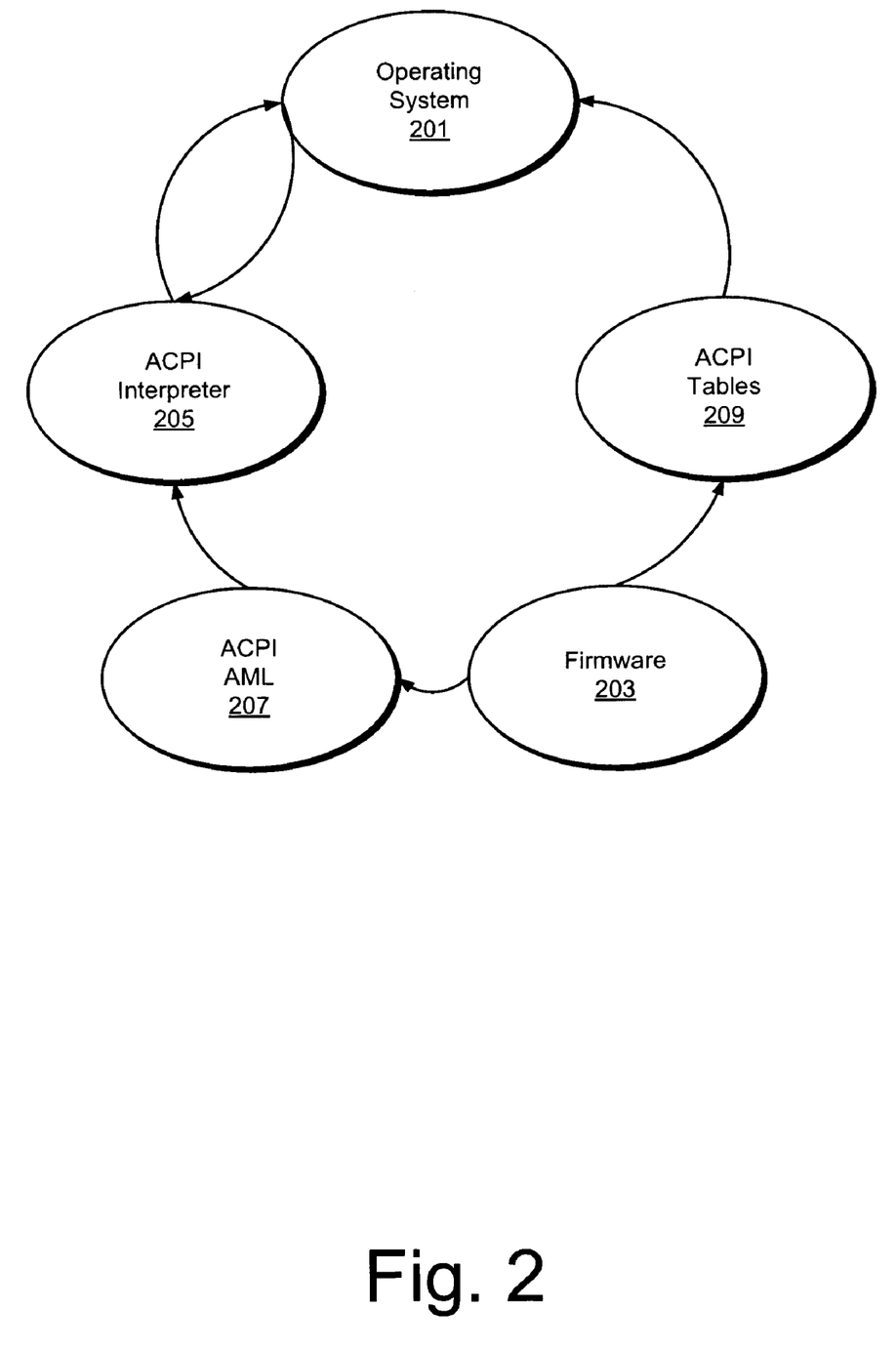
FIG. 2 a block diagram depicting interaction between an operating system and an ACPI interpreter and ACPI tables in accordance with an embodiment.

FIG. 2 a block diagram depicting interaction between the operating system (OS) and the ACPI interpreter and ACPI tables. During normal system operation, the OS 201 needs to access or operate some hardware function. To do this, it must have information about how the hardware operates. Upon boot-up, the system firmware 203 creates the ACPI namespace, as described above, and populates ACPI tables 209 with the system component information. When the OS 201 attempts to access or operate the hardware, it runs ACPI AML code 207 through the ACPI interpreter 205 to retrieve the system information.

The ACPI table comprises both static and dynamic tables. The dynamic tables may accommodate hot-pluggable devices, for instance. When the system firmware 203 is booting up, it runs its corresponding AML 207. It also sets up architected static tables 209. The tables are architected and the firmware will create those tables in memory, and leave them there (ACPI tables 209). When the OS takes control, it automatically knows how to find the ACPI tables 209, retrieves them, and consumes them. These ACPI tables 209 are static in nature. For a given boot, the static ACPI tables 209 will stay as they are without changing.

The firmware 203 also sets up the dynamic portion of ACPI AML 207. When the OS 201 starts up, it starts up the ACPI interpreter 205. The interpreter 205 consumes the AML 207. This AML 207 is partially static, as described above, and partially dynamic in nature. A hot-pluggable card may be added to the system. When the hot-pluggable card is added, it generates an instruction on how to handle it. There is an AML byte code written and executed for that hot plug event. The event is handled and a status is then given back to the OS. In this way, the OS does not have to know how certain system hot-plug operations have to happen. The firmware designers write the hot-plug definition in ASL, compile the code, and it becomes a part of the AML 207. The OS executes and determines that it needs to, for instance, eject a hot-pluggable device. The OS sends instructions to the ACPI interpreter 205, and then manipulates the hardware. For example, the device may be ejected, and the OS may wait for a status to be returned from the operation.

In some embodiments, ACPI provides a standard interface, referred to as an OpRegion, which is in essence an address space in memory. Vendors may use the OpRegion to use AML control methods with proprietary hardware of the platform that was not designed for use with AML. For example, firmware for a proprietary device may be written in AML and a handler may be invoked to extend the AML interpreter to interface with the proprietary hardware.

In operation, AML control methods use the OpRegion to store values into the register(s) of the proprietary hardware and load values from the registers of the proprietary hardware. For example, the AML interpreter may invoke a registered function within the OpRegion handler to accomplish each load or store operation.

Figure 3:
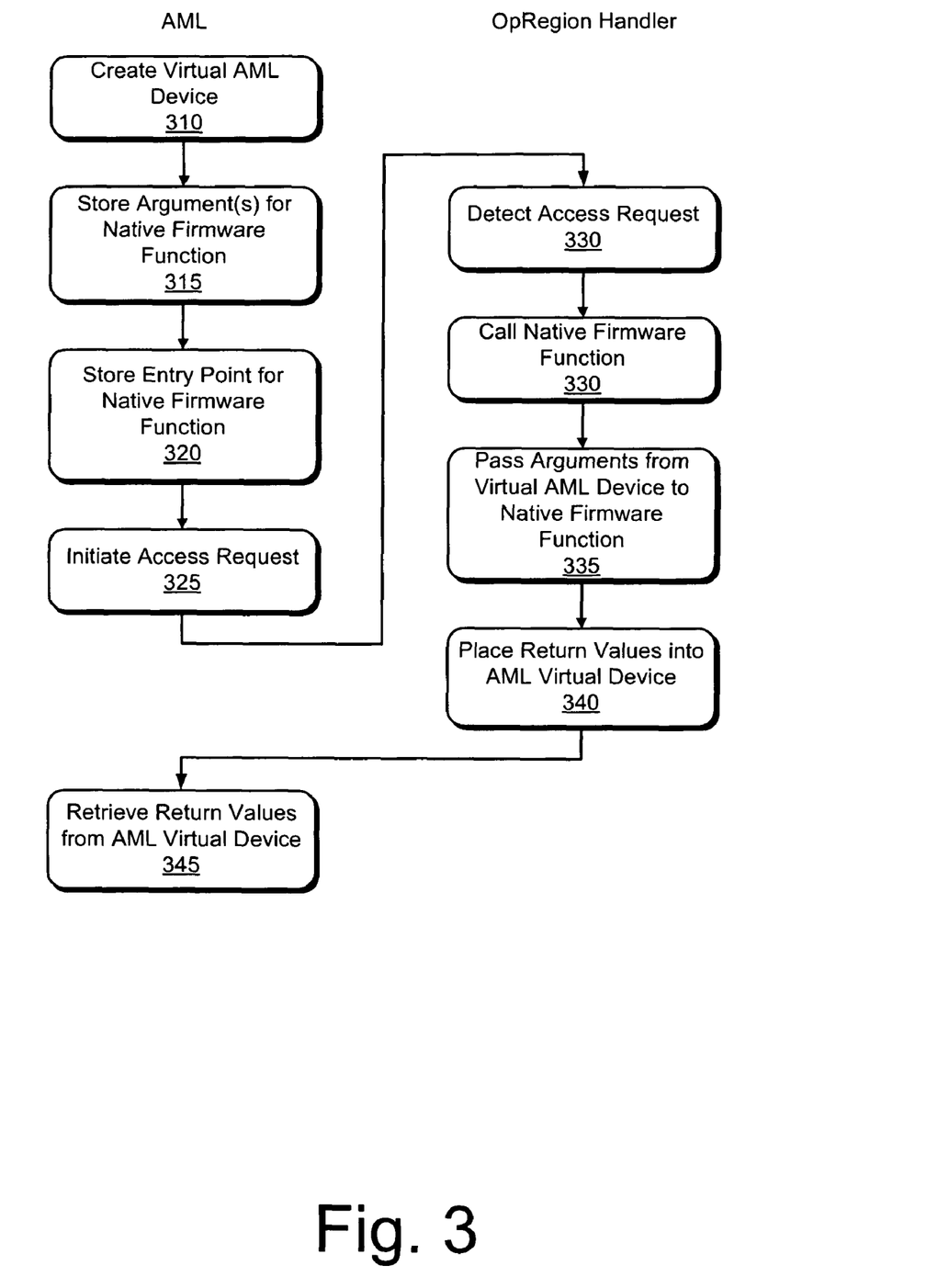
FIG. 3 is a flowchart illustrating operations in one embodiment of implementing BIOS security management.

FIG. 3 is a flowchart illustrating operations in one embodiment of implementing an interface between an ACPI AML interpreter and native firmware in a computing system. Referring to FIG. 3, at operation 310, a virtual AML device is created. In some embodiments the operating system provides an OpRegion handler which may be used to call native firmware. For example, when the Operating System boots, (typically before ACPI is initialized), the Operating System may register with ACPI an OpRegion Address Space handler for calling native firmware using the OEM address_space_id specified in this document. The Address Space handler defines an OpRegion consisting of a 'C' structure as follows:

```
typedef struct
{ UINT64 uArg[8]; // Arguments for the firmware function
UINT64 uReturn[4]; // Returned values from the firmware call
UINT64 pCall; // Adr(Native Firmware Function to call)
```

```
    UINT64 uGp;    // 'gp' value for above function call
    UINT64 uPad[2]; // Pad to a power of 2 boundary
} tFwCall;
```

AML can then define an OpRegion as follows:

```
Scope(\_SB) {
    // define the OpRegion of the 'Native Firmware Service',
    // that is -- the 'C' struct
    OperationRegion(NFW, "NativeFirmwareCall", 0, 128)
    Field(NFW, QWordAcc, NoLock, Preserve)
    {
        Arg0, 64, // Arg0 register sent to native function
        Arg1, 64, // Arg1 register sent to native function
        Arg2, 64, // Arg2 register sent to native function
        Arg3, 64, // Arg3 register sent to native function
        Arg4, 64, // Arg4 register sent to native function
        Arg5, 64, // Arg5 register sent to native function
        Arg6, 64, // Arg6 register sent to native function
        Arg7, 64, // Arg7 register sent to native function
        Ret0, 64, // Return register 0 returned from native function
        Ret1, 64, // Return register 1 returned from native function
        Ret2, 64, // Return register 2 returned from native function
        Ret3, 64, // Return register 3 returned from native function
        Text, 64, // Adr(text entry point to native function)
        Data, 64, // gp value for entering native function
        Pad0, 64,
        Pad1, 64
    }
```

At operation 315 the AML stores one or more arguments for a native firmware function into the data structure. When the AML makes a call to native firmware, AML encodes a series of stores to put the arguments of the call into the Native Firmware OpRegion (i.e., into the data structure) as though the AML were storing values into registers of a device. At operation 320 the AML stores an entry point for the native firmware function, and at operation 325 the AML initiates an access request to the native firmware.

At operation 330 the OpRegion handler detects the access requested initiated in operation 325. In response to the request, the OpRegion handler then calls the native firmware function (operation 330) and passes the arguments from the virtual AML device to the native firmware function (operation 335). Values returned from the native firmware function are placed into the AML virtual device at operation 340. At operation 345 the AML retrieves the return values from the AML virtual device.

In one embodiment, AML obtains the results of the call to native firmware by encoding a load from a 'uReturn[0]' word in the native firmware OpRegion. The handler function in the OpRegion detects that this is a get from the 'uReturn[0]' word, calls native firmware (at pCall, uGp) using the stored argument values, stores the return registers from the native function into 'uReturn[0-3], and returns 'uReturn[0]' to AML as the value of the load. An example method in AML is as follows:

```
Method(FOO, 0)
{
    Store(10, \_SB.NFW.Arg0)
    Store(33, \_SB.NFW.Arg1)
    Store(44, \_SB.NFW.Arg2)
    Store(55, \_SB.NFW.Arg3)
    Store(66, \_SB.NFW.Arg4)
    Store(77, \_SB.NFW.Arg5)
    Store(, \_SB.NFW.Text)
    Store( )>, \_SB.NFW.Data)
    Store(\_SB.NFW.Ret0, Local0)) // Call Native FW function, Get RET0
    Store(\_SB.NFW.Ret1, Local1)) // Retrieve Return value 1
    Store(\_SB.NFW.Ret2, Local2)) // Retrieve return value 2
    Store(\_SB.NFW.Ret3, Local3)) // Retrieve return value 3
    Return( Local0 ) // return the value from NFW to caller of FOO
}
```

In some embodiments the AML stores the physical addresses for the entry to native firmware into 'pCall' and 'uGp' words of the virtual AML device. The OpRegion handler retrieves these values before each call into a native firmware function. In this manner, AML can specify a different adr(text) and adr(gp) on each call to native firmware. The address values may point to either cacheable or uncacheable addresses as indicated by bit 63 of the address value. The operating system should adhere to the cache attribute of the address if virtual mode operation of the pCall is performed.

Figure 4:
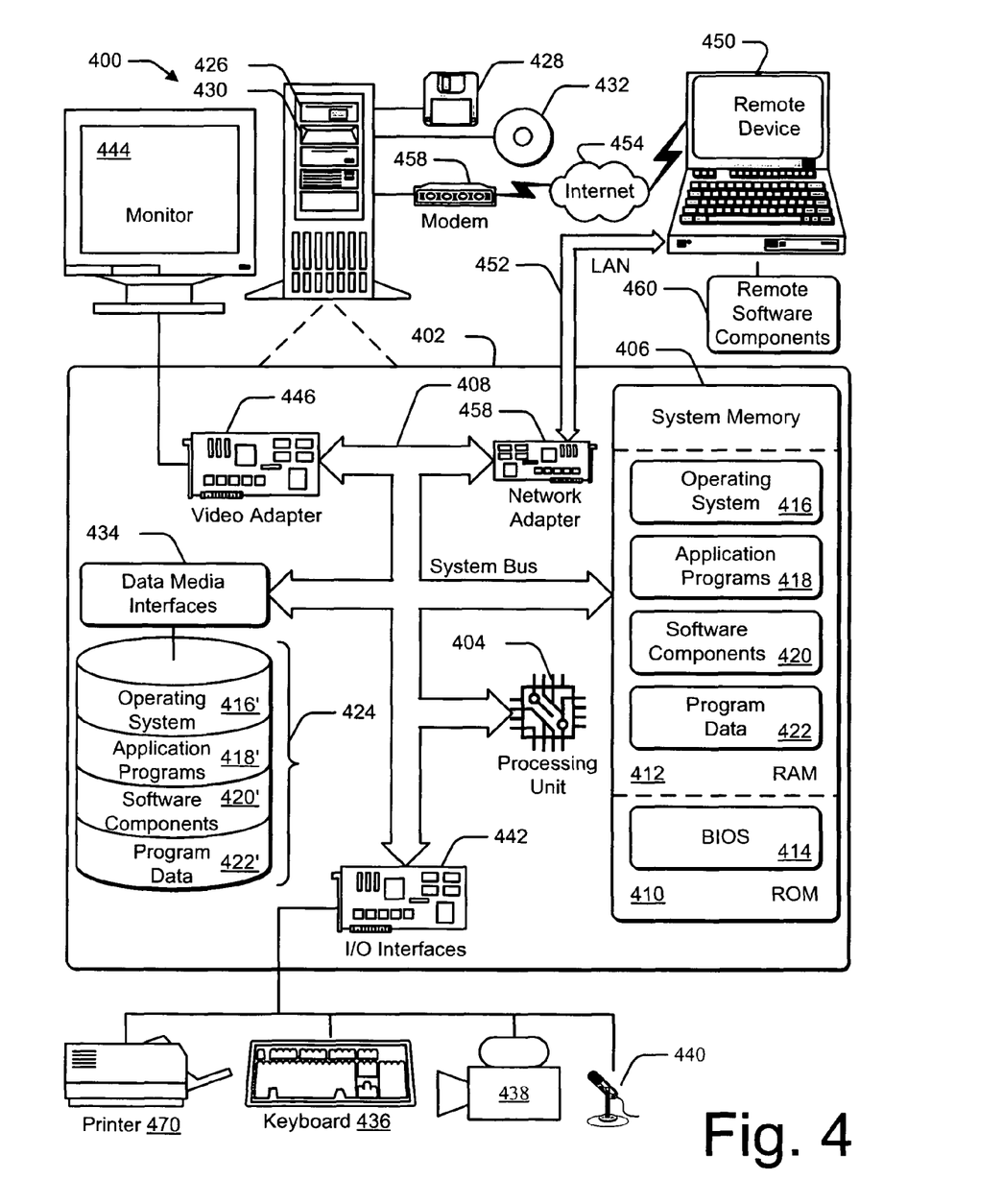
FIG. 4 is a schematic illustration of one embodiment of a computing environment.

FIG. 4 is a schematic illustration of one embodiment of a computing environment. The components shown in FIG. 4 are only examples, and are not intended to suggest any limitation as to the scope of the functionality of the invention; the invention is not necessarily dependent on the features shown in FIG. 4.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 4, the components of computer 400 may include, but are not limited to, a processing unit 404, a system memory 406, and a system bus 408 that couples various system components including the system memory 406 to the processing unit 404. The system bus 408 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus, and PCI Express (PCIE).

Computer 400 typically includes a variety of computer-readable media. Computer-readable media can be any available media that can be accessed by computer 400 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 406 includes computer storage media in the form of volatile and/or nonvolatile memory such as read only memory (ROM) 410 and random access memory (RAM) 412. A basic input/output system 414 (BIOS), containing the basic routines that help to transfer information between elements within computer 400, such as during start-up, is typically stored in ROM 410. RAM 412 typically contains data and/or program modules that are immediately accessible to and/or presently being operated on by processing unit 404. By way of example, and not limitation, FIG. 4 illustrates operating system 416, application programs 418, other software components 420, and program data 422.

The computer 400 may also include other removable/non-removable, volatile/nonvolatile computer storage media. By way of example only, the computer system of FIG. 4 may include a hard disk drive 424 that reads from or writes to non-removable, nonvolatile magnetic media, a magnetic disk drive 426 that reads from or writes to a removable, nonvolatile magnetic disk 428, and an optical disk drive 430 that reads from or writes to a removable, nonvolatile optical disk 432 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 424 is typically connected to the system bus 408 through a non-removable memory interface such as data media interface 434, and magnetic disk drive 426 and optical disk drive 430 are typically connected to the system bus 408 by a removable memory interface.

The drives and their associated computer storage media discussed above and illustrated in FIG. 4 provide storage of computer-readable instructions, data structures, program modules, and other data for computer 400. In FIG. 4, for example, hard disk drive 424 is illustrated as storing operating system 416', application programs 418', software components 420', and program data 422'. Note that these components can either be the same as or different from operating system 416, application programs 418, software components 420, and program data 422. Operating system 416, application programs 418, other program modules 420, and program data 422 are given different numbers here to illustrate that, at a minimum, they are different copies. A user may enter commands and information into the computer 400 through input devices such as a keyboard 436 and pointing device 438, commonly referred to as a mouse, trackball, or touch pad. Other input devices (not shown) may include a microphone 440, joystick, game pad, satellite dish, scanner, or the like. These and other input devices are often connected to the processing unit 404 through an input/output (I/O) interface 442 that is coupled to the system bus, but may be connected by other interface and bus structures, such as a parallel port, game port, or a universal serial bus (USB). A monitor 444 or other type of display device is also connected to the system bus 406 via an interface, such as a video adapter 446. In addition to the monitor 444, computers may also include other peripheral output devices (e.g., speakers) and one or more printers 470, which may be connected through the I/O interface 442.

The computer may operate in a networked environment using logical connections to one or more remote computers, such as a remote computing device 450. The remote computing device 450 may be a personal computer, a server, a router, a network PC, a peer device or other common network node, and typically includes many or all of the elements described above relative to computer 400. The logical connections depicted in FIG. 4 include a local area network (LAN) 452 and a wide area network (WAN) 454. Although the WAN 454 shown in FIG. 4 is the Internet, the WAN 454 may also include other networks. Such networking environments are commonplace in offices, enterprise-wide computer networks, intranets, and the like.

When used in a LAN networking environment, the computer 400 is connected to the LAN 452 through a network interface or adapter 456. When used in a WAN networking environment, the computer 400 typically includes a modem 458 or other means for establishing communications over the Internet 454. The modem 458, which may be internal or external, may be connected to the system bus 406 via the I/O interface 442, or other appropriate mechanism. In a networked environment, program modules depicted relative to the computer 400, or portions thereof, may be stored in the remote computing device 450. By way of example, and not limitation, FIG. 4 illustrates remote application programs 460 as residing on remote computing device 450. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method to interface between an AML interpreter and a native firmware function in a computing system, comprising:
    creating a virtual AML device data structure, the data structure comprising a plurality of fields to hold arguments to a native firmware function, wherein the virtual AML device data structure is partially based on ACPI tables wherein the ACPI tables are partially static and partially dynamic;
    storing at least one argument for the native firmware function in a register of the AML device data structure;
    storing an entry point and a pointer value in a register of the virtual AML device data structure; and
    initiating an access request to a firmware access register in the AML device data structure.

2. The method of claim 1, further comprising:
    in an ACPI OpRegion handler:
    detecting the access request to the firmware access register; and
    calling the native firmware function; and
    passing the arguments from the virtual AML device data structure to the native firmware function.

3. The method of claim 2, further comprising placing at least one value returned from the native firmware function into a field in the AML device data structure.

4. The method of claim 3, further comprising reading at least one value returned from the native firmware function from the AML device data structure.

5. The method of claim 1, wherein creating a virtual AML device data structure comprises registering an OpRegion address space handler.

6. The method of claim 1, wherein storing at least one argument for the native firmware function in a register of the AML device data structure comprises encoding at least one store operation to write the argument to the register.

7. The method of claim 1, wherein a storing an entry point and a pointer value in a register of the virtual AML device data structure comprises storing a physical address for the native firmware function as a parameter.

8. The method of claim 1, wherein a storing an entry point and a pointer value in a register of the virtual AML device data structure comprises storing a virtual address for the native firmware function as a parameter.

9. A computer system, comprising:
    a processor;
    a memory module comprising logic instructions stored on a computer readable medium which, when executed, configure the processor to:
        create a virtual AML device data structure, the data structure comprising a plurality of fields to hold arguments to a native firmware function, wherein the virtual AML device data structure is partially based on ACPI tables wherein the ACPI tables are partially static and partially dynamic;
        store at least one argument for the native firmware function in a register of the AML device data structure;
        store an entry point and a pointer value in a register of the virtual AML device data structure; and
        initiate an access request to a firmware access register in the AML device data structure.

10. The computer system of claim 9, further comprising logic instructions stored on a computer readable medium which, when executed, configure the processor to:
    detect the access request to the firmware access register; and
    call the native firmware function; and
    pass the arguments from the virtual AML device data structure to the native firmware function.

11. The computer system of claim 9, further comprising logic instructions stored on a computer readable medium which, when executed, configure the processor to place at least one value returned from the native firmware function into a field in the AML device data structure.

12. The computer system of claim 9, further comprising logic instructions stored on a computer readable medium which, when executed, configure the processor to read at least one value returned from the native firmware function from the AML device data structure.

13. The computer system of claim 9, further comprising logic instructions stored on a computer readable medium which, when executed, configure the processor to register an OpRegion address space handler.

14. The computer system of claim 9, further comprising logic instructions stored on a computer readable medium which, when executed, configure the processor to encode at least one store operation to write the argument to the register.

15. The computer system of claim 9, further comprising logic instructions stored on a computer readable medium which, when executed, configure the processor to store a physical address for the native firmware function as a parameter.

16. The computer system of claim 9, further comprising logic instructions stored on a computer readable medium which, when executed, configure the processor to store a virtual address for the native firmware function as a parameter.

17. A computer program product comprising logic instructions stored on a non-transitory computer readable storage medium which, when executed, configure the processor to:
    create a virtual AML device data structure, the data structure comprising a plurality of fields to hold arguments to a native firmware function, wherein the virtual AML device data structure is partially based on ACPI tables wherein the ACPI tables are partially static and partially dynamic;

store at least one argument for the native firmware function in a register of the AML device data structure;

store an entry point and a pointer value in a register of the virtual AML device data structure; and initiate an access request to a firmware access register in the AML device data structure.

18. The computer program product of claim 17, further comprising logic instructions stored on a non-transitory computer readable storage medium which, when executed, configure the processor to:

detect the access request to the firmware access register; and call the native firmware function; and pass the arguments from the virtual AML device data structure to the native firmware function.

19. The computer program product of claim 17, further comprising logic instructions stored on a non-transitory computer readable storage medium which, when executed, configure the processor to place at least one value returned from the native firmware function into a field in the AML device data structure.

20. The computer program product of claim 17, further comprising logic instructions stored on a non-transitory computer readable storage medium which, when executed, configure the processor to read at least one value returned from the native firmware function from the AML device data structure.

* * * * *